United States Patent
Shu et al.

(10) Patent No.: US 11,327,380 B2
(45) Date of Patent: May 10, 2022

(54) ARRAY SUBSTRATE, DISPLAY PANEL AND DISPLAY DEVICE

(71) Applicant: BOE TECHNOLOGY GROUP CO., LTD., Beijing (CN)

(72) Inventors: Shi Shu, Beijing (CN); Xiang Li, Beijing (CN); Chuanxiang Xu, Beijing (CN); Yong Yu, Beijing (CN); Haitao Huang, Beijing (CN); Yang Yue, Beijing (CN); Qi Yao, Beijing (CN); Rui Huang, Beijing (CN); Ge Shi, Beijing (CN); Kang Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/263,984

(22) PCT Filed: May 27, 2020

(86) PCT No.: PCT/CN2020/092442
§ 371 (c)(1),
(2) Date: Jan. 28, 2021

(87) PCT Pub. No.: WO2020/238919
PCT Pub. Date: Dec. 3, 2020

(65) Prior Publication Data
US 2021/0231990 A1 Jul. 29, 2021

(30) Foreign Application Priority Data
May 27, 2019 (CN) .......................... 201910444498.3

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136222* (2021.01)

(58) Field of Classification Search
None
See application file for complete search history.

(56) References Cited

U.S. PATENT DOCUMENTS 7,755,711 B2 7/2010 Kenmochi et al.
9,356,076 B2 5/2016 Wang et al.
(Continued)

FOREIGN PATENT DOCUMENTS

CN 101211083 A 7/2008
CN 103730472 A 4/2014
(Continued)

OTHER PUBLICATIONS 105182601 translation (Year: 2015).*
First office action issued in Chinese Patent Application No. 201910444498.3 with search report.

*Primary Examiner* — James A Dudek
(74) *Attorney, Agent, or Firm* — Chiwin Law LLC

(57) ABSTRACT

An array substrate, a display panel and a display device are provided. The array substrate includes, a base substrate, a thin film transistor layer, a first passivation layer, a quantum dot layer, a color filter layer, a planarization layer and a metal wire grid polarizing layer that are sequentially disposed on the base substrate. The quantum dot layer is located in a display region of the array substrate, and an orthographic projection of the color filter layer on the base substrate is within an orthographic projection of the color filter layer on the base substrate.

20 Claims, 2 Drawing Sheets

(56) References Cited

U.S. PATENT DOCUMENTS

| | | | |
|---|---|---|---|
| 9,455,414 B2 | 9/2016 | Shu et al. | |
| 9,766,493 B2 | 9/2017 | Cheng et al. | |
| 9,880,414 B2 | 1/2018 | Li | |
| 10,209,557 B2 | 2/2019 | Niu et al. | |
| 10,872,933 B2 | 12/2020 | Wang et al. | |
| 2016/0313599 A1* | 10/2016 | Kwon | ............... G02F 1/133514 |
| 2019/0305156 A1 | 10/2019 | Ren et al. | |
| 2020/0321408 A1 | 10/2020 | Wang et al. | |
| 2021/0088840 A1 | 3/2021 | Yang et al. | |

FOREIGN PATENT DOCUMENTS

| | | |
|---|---|---|
| CN | 104330915 A | 2/2015 |
| CN | 104765187 A | 7/2015 |
| CN | 105182594 A | 12/2015 |
| CN | 105182601 A | 12/2015 |
| CN | 105304673 A | 2/2016 |
| CN | 105911749 A | 8/2016 |
| CN | 106405927 A | 2/2017 |
| CN | 106773405 A | 5/2017 |
| CN | 107731880 A | 2/2018 |
| CN | 108470783 A | 8/2018 |
| CN | 108535904 A | 9/2018 |
| CN | 109728050 A | 5/2019 |
| CN | 109742126 A | 5/2019 |
| CN | 110137184 A | 8/2019 |

* cited by examiner

ARRAY SUBSTRATE, DISPLAY PANEL AND DISPLAY DEVICE

This application is a U.S. National Phase Entry of International Application No. PCT/CN2020/092442 filed on May 27, 2020, designating the United States of America and claiming priority to Chinese Patent Application No. 201910444498.3, filed on May 27, 2019. The present application claims priority to and the benefit of the above-identified applications and the above-identified applications are incorporated by reference herein in their entirety for all purposes.

TECHNICAL FIELD

Embodiments of the present disclosure relate to an array substrate, a display panel and a display device.

BACKGROUND

With the development of liquid crystal display products, the transmittance and color gamut of liquid crystal display panels have encountered bottlenecks, and the method of wavelength conversion has to be selected to improve the transmittance and the color gamut of the liquid crystal display panels to meet display requirements.

Quantum dot material is an excellent wavelength conversion material. The quantum dot material is made into quantum dot patterns with pixel-level sizes, which can specifically convert light from a backlight into light with a color required by the pixel, which can not only meet the requirements of the transmittance and the color gamut, but also increase the utilization of the backlight.

Because the fluorescent properties of the quantum dot material may completely destroy a polarization state of light, the quantum dot material must be used with built-in polarizers. At present, the best built-in polarizers are metal nano-gratings. Because the metal nano-gratings are made of metal materials, if the nano-gratings are made on an upper substrate, an electric field will be formed between the metal nano-gratings and pixel electrodes on a lower substrate. For liquid crystal display products in an In-Plane-Switching (IPS) display mode or an Advanced-Super-Dimension-Switch (ADS) display mode, the electric field will cause a significant reduction in the liquid crystal display efficiency. Therefore, the metal nano-gratings are usually disposed on the lower substrate. If the metal nano-gratings are disposed on the lower substrate, in order to realize normal display, the quantum dot patterns must also be disposed on the lower substrate.

SUMMARY

According to at least one embodiment of the present disclosure, an array substrate is provided, and the array substrate comprises: a base substrate; a thin film transistor layer on the base substrate; a first passivation layer on a side of the thin film transistor layer away from the base substrate; a quantum dot layer on a side of the first passivation layer away from the base substrate and in a display region of the array substrate; a color filter layer on a side of the quantum dot layer away from the base substrate, in which an orthographic projection of the quantum dot layer on the base substrate is within an orthographic projection of the color filter layer on the base substrate; a planarization layer on a side of the first passivation layer away from the base substrate and on a side of the color filter layer away from the base substrate; and a metal grid polarizing layer on a side of the planarization layer away from the base substrate.

For example, the thin film transistor layer comprises a driving transistor part and a light sensing compensation transistor part, each of the driving transistor part and the light sensing compensation transistor part comprises a gate electrode, a gate insulating layer, an active layer, a source electrode and a drain electrode; the array substrate further comprises a photoelectric conversion device, the photoelectric conversion device is configured to receive a part of excitation light generated by the quantum dot layer and is reflected by the metal grid polarizing layer and convert the part of the excitation light into an electrical signal; and the photoelectric conversion device comprises an upper electrode, a lower electrode, and a photoelectric conversion layer between the upper electrode and the lower electrode, and the lower electrode is electrically connected to the source electrode or the drain electrode of the light sensing compensation transistor part.

For example, the array substrate further comprises a plurality of gate lines and a plurality of data lines, in which the plurality of the gate lines and the plurality of the data lines intersect each other to define a plurality of display sub-pixels, each of the display sub-pixels comprises the driving transistor part, the gate electrode of the driving transistor part is electrically connected to a corresponding gate line, and the source electrode or the drain electrode of the driving transistor is electrically connected to a corresponding data line; and in each of the display sub-pixels, a pixel electrode is provided on a side of the metal grid polarizing layer away from the base substrate, and the pixel electrode is electrically connected to the drain electrode or the source electrode of the driving transistor part through a second via hole and a second lead line filled in the second via hole.

For example, the light sensing compensation transistor part and the photoelectric conversion device are in at least one display sub-pixel of the plurality of the display sub-pixels; the array substrate further comprises a sensing control line provided in parallel with the plurality of the gate lines and a signal reading line provided in parallel with the plurality of the data lines; and the gate electrode of the light sensing compensation transistor part is electrically connected to the sensing control line, and the drain electrode or the source electrode of the light sensing compensation transistor part is electrically connected to the signal reading line.

For example, the array substrate further comprises a common electrode line provided in parallel with the plurality of the gate lines, and in each of the display sub-pixels, the metal grid polarizing layer is electrically connected to the common electrode line through a first via hole and a first lead line filled in the first via hole, so that the metal grid polarizing layer is further used as a common electrode; and in the at least one display sub-pixel, the metal grid polarizing layer is electrically connected to the upper electrode of the photoelectric conversion device through a third via hole and a third lead line filled in the third via hole.

For example, the at least one display sub-pixel is a blue sub-pixel.

For example, the orthographic projection of the color filter layer on the base substrate covers an orthographic projection of the active layer of the driving transistor part on the base substrate and an orthographic projection of the active layer of the light sensing compensation transistor part on the base substrate.

For example, the array substrate further comprises a black matrix layer between the color filter layer and the thin film transistor layer, and an orthographic projection of the black matrix layer on the base substrate covers an orthographic projection of the active layer of the driving transistor part on the base substrate and an orthographic projection of the active layer of the light sensing compensation transistor part on the base substrate.

For example, the black matrix layer further covers a side surface of the photoelectric conversion layer, and an extension line of the side surface intersects with the base substrate.

For example, the array substrate further comprises a second passivation layer between the first passivation layer and the thin film transistor layer, the second passivation layer covers the driving transistor part and the light sensing compensation transistor part; and the photoelectric conversion device is between the first passivation layer and the second passivation layer, and the lower electrode of the photoelectric conversion device is electrically connected to the source electrode or the drain electrode of the light sensing compensation transistor through a fourth via hole penetrating the second passivation layer.

For example, the array substrate further comprises a plurality of gate lines and a plurality of data lines, in which the plurality of the gate lines and the plurality of the data lines intersect each other to define a plurality of display sub-pixels, the plurality of the display sub-pixels comprise a first display sub-pixel, a second display sub-pixel, and a third display sub-pixel; and the quantum dot layer comprises a first quantum dot pattern in the first display sub-pixel, a second quantum dot pattern in the second display sub-pixel, and a third quantum dot pattern in the third display sub-pixel, the first quantum dot pattern, the second quantum dot pattern, and the third quantum dot pattern emit light under excitation of light from a backlight, so that the first display sub-pixel, the second display sub-pixel, and the third display sub-pixel respectively emit light of three different colors.

For example, the light from the backlight is ultraviolet light; the first display sub-pixel is a red sub-pixel, and the first quantum dot pattern generates red light under excitation of the ultraviolet light; the second display sub-pixel is a green sub-pixel, and the second quantum dot pattern generates green light under excitation of the ultraviolet light; and the third display sub-pixel is a blue sub-pixel, and the third quantum dot pattern generates blue light under excitation of the ultraviolet light.

For example, the array substrate further comprises a plurality of gate lines and a plurality of data lines, the plurality of the gate lines and the plurality of the data lines intersect each other to define a plurality of display sub-pixels, the plurality of the display sub-pixels comprise a first display sub-pixel, a second display sub-pixel, and a third display sub-pixel; the quantum dot layer comprises a first quantum dot pattern in the first display sub-pixel and a second quantum dot pattern in the second display sub-pixel; the array substrate further comprises a light diffusion pattern in the third display sub-pixel, and the light diffusion pattern is in a same layer as both the first quantum dot pattern and the second quantum dot pattern; and the first quantum dot pattern and the second quantum dot pattern emit light under excitation of light from a backlight, and light from the backlight passes through the light diffusion pattern and is uniformized by the light diffusion pattern, so that the first display sub-pixel, the second display sub-pixel, and the third display sub-pixel respectively emit light of three different colors.

For example, the third display sub-pixel is a blue sub-pixel, and the light from the backlight is blue light; the first display sub-pixel is a red sub-pixel, and the first quantum dot pattern generates red light under excitation of the blue light; and the second display sub-pixel is a green sub-pixel, and the second quantum dot pattern generates green light under excitation of the blue light.

For example, the light diffusion pattern comprises an organic matrix and inorganic particles dispersed in the organic matrix.

For example, the metal grid polarizing layer comprises an etching barrier layer on a side of the planarization layer away from the base substrate, a metal grid layer on a side of the etching barrier layer away from the base substrate, and a protection layer on a side of the metal grid layer away from the base substrate.

For example, the metal grid layer comprises a plurality of metal strips provided in parallel with one another, and the protection layer covers two adjacent metal strips of the plurality of the metal strips and covers a region between the two adjacent metal strips, but the protection layer is not in contact with the etching barrier layer exposed in the region between the two adjacent metal strips.

For example, the planarization layer comprises a thermal curable layer and a photo curable layer, the thermal curable layer is closer to the base substrate than the photo curable layer, and a surface of the photo curable layer away from the base substrate is flat.

According to at least one embodiment of the present disclosure, a display panel is provided, and the display panel comprises: any one of the array substrates mentioned above, a counter substrate provided opposite to the array substrate, and a liquid crystal layer between the array substrate and the counter substrate.

According to at least one embodiment of the present disclosure, a display device is provided, and the display device comprises: any one of the display panels mentioned above.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Figure 1:
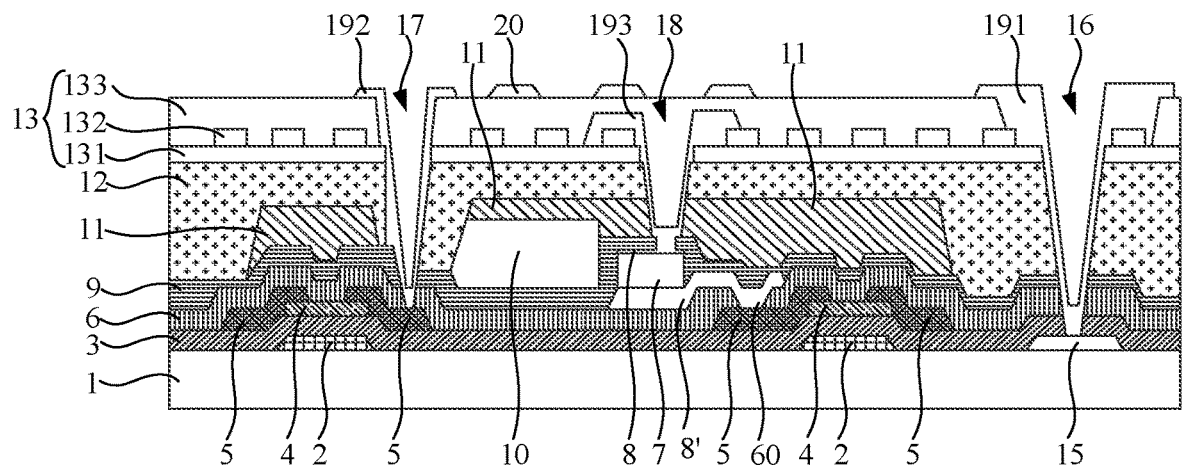
FIG. 1 is a schematic diagram of a structure of an array substrate provided by an embodiment of the present disclosure.

Referring to FIG. 1, at least one embodiment of the present disclosure provides an array substrate, which includes a base substrate 1; a thin film transistor layer on the base substrate 1; a first passivation layer 9 on a side of the thin film transistor layer away from the base substrate 1; a quantum dot layer 10 on a side of the first passivation layer 9 away from the base substrate 1 and in a display region of the array substrate; a color filter layer 11 on a side of the quantum dot layer 10 away from the base substrate 1, in which an orthographic projection of the quantum dot layer 10 on the base substrate 1 is within an orthographic projection of the color filter layer 11 on the base substrate 1; a planarization layer 12 on a side of the first passivation layer 9 away from the base substrate 1 and on a side of the color filter layer 11 away from the base substrate 1; and a metal grid polarizing layer 13 on a side of the planarization layer 12 away from the base substrate 1.

The above array substrate includes the base substrate and the thin film transistor layer, the first passivation layer 9, the quantum dot layer 10, the color filter layer 11, the planarization layer 12, and the metal grid polarizing layer 13 that are sequentially arranged on the base substrate. The quantum dot layer 10 is arranged in the display region, the color filter layer 11 is provided on the side of the quantum dot layer 10 away from the base substrate 1, and the orthographic projection of the color filter layer 11 on the base substrate 1 covers the orthographic projection of the quantum dot layer 10 on the base substrate 1, the planarization layer 12 is provided on the side of the color filter layer 11 and the first passivation layer 9 away from the base substrate 1, and the metal grid polarizing layer 13 is provided on the side of the planarization layer 12 away from the base substrate 1. The thin film transistor layer includes a plurality of electrical components, the first passivation layer 9 covers the thin film transistor layer to provide protection for the thin film transistor layer and achieve required electrical insulation between the electrical components in the thin film transistor layer and other electrical components. The quantum dot layer 10 is arranged in the display region and generates excitation light under excitation of light from a backlight. The excitation light is modulated by the liquid crystal layer 21 (see below) to realize the display function; by using the quantum dot layer 10, the display effect of the display device can be significantly improved and the utilization rate of light from the backlight can also be improved.

However, on the one hand, the quantum dot layer 10 may not be able to convert all the light from the backlight, so that part of the light from the backlight may pass through the quantum dot layer 10 and mix with the excitation light, which results in the monochromaticity of the excitation light being poor. On the other hand, light from external environment may also be incident on the quantum dot layer 10 from the side of the metal grid polarizing layer 13 away from the base substrate 1, which causes the quantum dot layer 10 to be undesirably excited to emit light by external ambient light. In order to solve the above problems, according to the embodiments of the present disclosure, the color filter layer 11 is provided on the side of the quantum dot layer 10 away from the base substrate 1, and the orthographic projection of the color filter layer 11 on the base substrate 1 covers the orthographic projection of the quantum dot layer 10 on the base substrate 1, so as to shield light from the external environment and the part of light from the backlight and passing through the quantum dot layer 10, thereby ensuring the monochromaticity of the excitation light emitted by the quantum dot layer 10, and significantly improving the display effect of the display panel including the array substrate.

The fluorescent properties of the quantum dot material included in the quantum dot layer 10 may completely destroy the polarization state of light. Therefore, in order to achieve normal display, a built-in polarizer must be provided for the quantum dot layer 10. According to the embodiments of the present disclosure, the metal grid polarizing layer 13 is provided on the side of the quantum dot layer 10 away from the base substrate 1, so that the excitation light from the quantum dot layer 10 has polarization characteristics, thereby ensuring that the liquid crystal panel including the array substrate realizes normal display. The structure obtained after the quantum dot layer 10 is formed on the base substrate 1 has a large surface level difference, so that the production of the metal grid polarizing layer 13 with a nano-level fine structure cannot be performed normally. Therefore, in the embodiments of the present disclosure, after the quantum dot layer 10 is formed on the base substrate, the planarization layer 12 is provided on the side of the first passivation layer 9 and the color filter layer 11 away from the base substrate 1, and the metal grid polarizing layer 13 is provided on the planarization layer 12, so that the metal grid polarizing layer 13 of high quality can be obtained.

In the embodiments of the present disclosure, the array substrate includes both the quantum dot layer 10 and the metal grid polarizing layer 13, and the orthographic projection of the color filter layer 11 on the base substrate 1 covers the orthographic projection of the quantum dot layer 10 on the base substrate 1, which can significantly improve the display effect of the display panel using the array substrate.

It should be noted that, the quantum dot layer 10 in the display region of the array substrate can be understood as: the quantum dot layer 10 includes a plurality of quantum dot patterns (for example, a first quantum dot pattern 10a, a second quantum dot pattern 10b, and a third quantum dot pattern 10c described below), the plurality of the quantum dot patterns are respectively located in display regions of a plurality of display sub-pixels (for example, a first display sub-pixel, a second display sub-pixel, and a third display sub-pixel described below). For example, the plurality of the quantum dot patterns respectively located in the display regions of the plurality of the display sub-pixels are spaced apart from each other.

It should be noted that, the color filter layer 11 being on the side of the quantum dot layer 10 away from the base substrate 1 and the orthographic projection of the quantum dot layer 10 on the base substrate 1 being within the orthographic projection of the color filter layer 11 on the base substrate 1 can be understood as: in the display sub-pixels, the color filter layer 11 is provided on the side of the quantum dot pattern away from the base substrate 1 and the orthographic projection of the quantum dot pattern on the base substrate 1 is located within the orthographic projection of the color filter layer 11 on the base substrate 1. For example, the color filter layer 11 includes a plurality of parts respectively located in a plurality of the display sub-pixels, the plurality of the parts are spaced apart from each other, and the plurality of the parts respectively cover the plurality of the quantum dot patterns.

It should be noted that, in the display sub-pixel, the excitation light generated by the excitation of the quantum dot layer 10 (that is, the quantum dot patterns in the display sub-pixel) is monochromatic light, and the color of the excitation light is the same as the color of the light that can transmit through the color filter layer 11, so that the color filter layer 11 only allows the excitation light to pass and does not allow the light of a color different from the color of the excitation light to pass.

For example, the planarization layer 12 includes a thermal curable layer and a photo curable layer, the thermal curable layer is closer to the base substrate 1 than the photo curable layer, and a surface of the photo curable layer away from the base substrate 1 is flat. The thermal curing process is slow, which allows the material to be cured to flow sufficiently to eliminate as much surface levels as possible; the photo curing process is faster, and the material to be cured can be shaped as soon as possible when the material to be cured reaches a flat state to obtain a flat surface. The planarization layer 12 adopts a double-layer structure of the thermal curable layer and the photo curable layer, which can make the surface of the planarization layer 12 away from the base substrate 1 have excellent planarization characteristics, and ensure the yield rate of forming the metal grid polarizing layer 13, so as to better obtain the metal grid polarizing layer 13.

Figure 2:
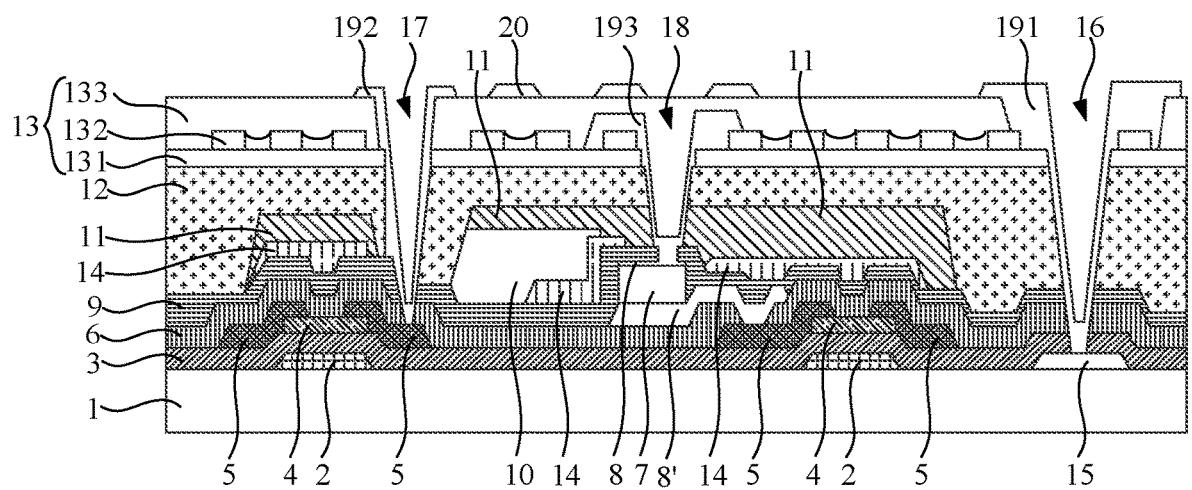
FIG. 2 is another schematic diagram of a structure of an array substrate provided by an embodiment of the present disclosure.

For example, as shown in FIG. 1 and FIG. 2, the thin film transistor layer includes a driving transistor part and a light sensing compensation transistor part. Each of the driving transistor part and the light sensing compensation transistor part includes a gate electrode 2 and a gate insulation layer 3, an active layer 4, a source electrode and a drain electrode formed on the base substrate 1. Because the source electrode and the drain electrode are symmetrical structures and are interchangeable, both the source electrode and the drain electrode are indicated by the reference numeral 5 in the figures.

For example, as shown in FIG. 1 and FIG. 2, the array substrate further includes a photoelectric conversion device disposed on the base substrate 1. The photoelectric conversion device is configured to receive a part of excitation light generated by the quantum dot layer 10 and reflected by the metal grid polarizing layer 13 and convert the part of excitation light into an electrical signal. The photoelectric conversion device includes an upper electrode 8, a lower electrode 8' and a photoelectric conversion layer 7 between the upper electrode 8 and the lower electrode 8', and the lower electrode 8' is electrically connected to the source electrode or the drain electrode of the light sensing compensation transistor part.

The excitation light generated by the excitation of the quantum dot layer 10 is incident on the metal grid polarizing layer 13 after being transmitted through the color filter layer 11, a part of the light is transmitted through the metal grid polarizing layer 13 to become polarized light, and a part of the light is reflected by the metal grid polarizing layer 13 to become reflected light. In the case where the amount of polarized light increases, the amount of reflected light decreases; and in the case where the amount of polarized light decreases, the amount of reflected light increases. The reflected light is incident on the photoelectric conversion device and is converted into an electric signal by the photoelectric conversion device, and the electric signal is output to a detection circuit through the light sensing compensation transistor part and a signal reading line to be described below. The detection circuit judges the magnitude of the electrical signal, and can judge the magnitude of the reflected light, and thus can judge the amount of the polarized light. As a result, the region where the amount of polarized light is abnormal can be found in real time, and the abnormal region can be compensated by an electrical compensation method to ensure the uniformity of the display image.

Figure 4:
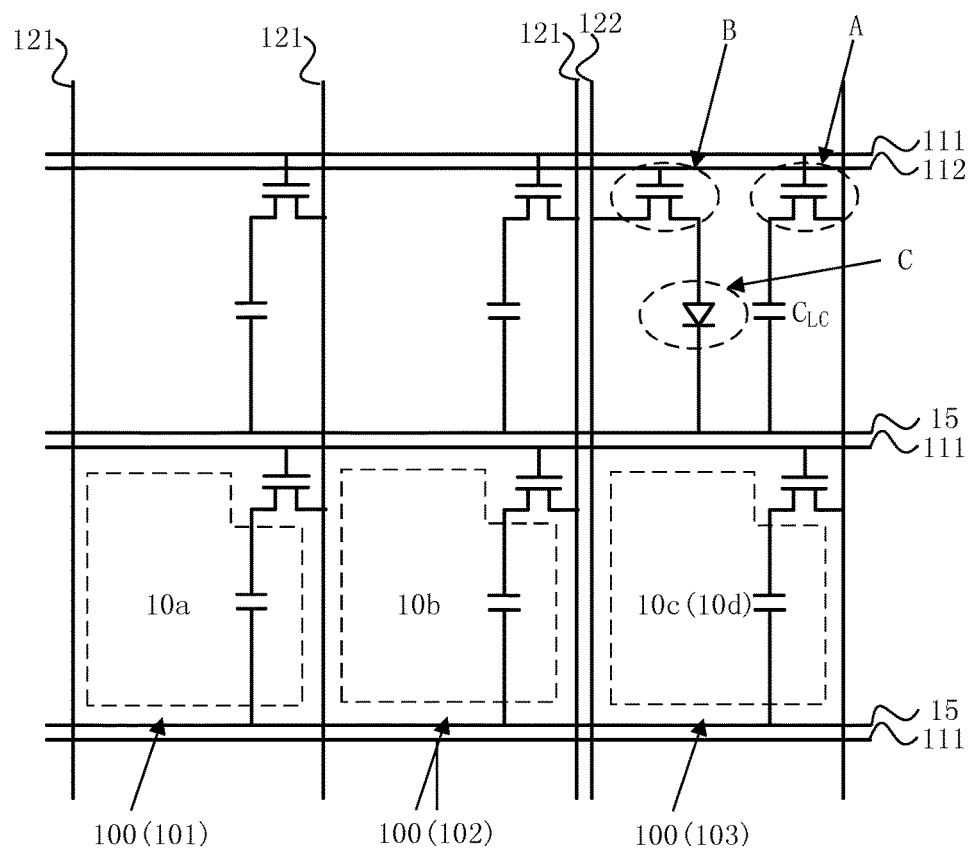
FIG. 4 is a circuit schematic diagram of an array substrate provided by an embodiment of the present disclosure.

In the following, the electrical connection relationship of the driving transistor part, the light sensing compensation transistor part and the light conversion device will be further described. FIG. 4 is a circuit schematic diagram of an array substrate provided by an embodiment of the present disclosure. Referring to FIG. 4, the array substrate includes a plurality of gate lines 111 and a plurality of data lines 121 disposed on the base substrate 1. The plurality of gate lines 111 and the plurality of the data lines 121 intersect each other to define a plurality of display sub-pixels 100; each of the display sub-pixels 100 includes a driving transistor part (referring to the region A in FIG. 4), the gate electrode of the driving transistor part is electrically connected to a corresponding gate line 111, and the source electrode or the drain electrode of the driving transistor is electrically connected to a corresponding data line 121. In each of the display sub-pixels, a pixel electrode 20 is provided on a side of the metal grid polarizing layer 13 away from the base substrate, the pixel electrode 20 is electrically connected to the drain electrode or the source electrode of the driving transistor part through a second via hole 17 and a second lead line 192 filled in the second via hole 17.

Continuing to refer to FIG. 4, the light sensing compensation transistor part (referring to the region B in FIG. 4) and the photoelectric conversion device (referring to the region C in FIG. 4) are located in at least one display sub-pixel of the plurality of the display sub-pixels 100; the array substrate further includes a sensing control line 112 arranged in parallel with the plurality of gate lines 111 and a signal reading line 122 arranged in parallel with the plurality of the data lines 121; the gate electrode of the light sensing compensation transistor part is electrically connected to the sensing control line 112, and the drain electrode or the source electrode of the sensing compensation transistor part is electrically connected to the signal reading line 122. A control signal is applied to the sensing control line 112 to control the turn-on and turn-off of the light sensing compensation transistor part. For example, in the case where the light sensing compensation transistor part is turned on, and the electrical signal generated by the photoelectric conversion device is output to the signal reading line 122 through the light sensing compensation transistor part, and then is output to an external detection circuit through the signal reading line 122, and the external detection circuit judges the magnitude of the electrical signal. According to the signal fed back from the detection circuit, it is determined whether there is a region with uneven display brightness, thereby determining whether to perform electrical compensation.

For example, referring to FIG. 1, FIG. 2 and FIG. 4, the array substrate further includes a common electrode line 15 arranged in parallel with the plurality of the gate lines 111. In each of the display sub-pixels 100, the metal grid polarizing layer 13 is electrically connected to the common electrode line 15 through a first via hole 16 and a first lead line 191 filled in the first via hole 16, so that the metal grid polarizing layer 13 is further used as a common electrode. For example, the metal grid polarizing layer 13 includes a plurality of metal strips, and a width of each of the metal strips is in a nanometer level, and a width of a region between adjacent metal strips is also in the nanometer level. In this case, the metal grid polarizing layer 13 can be regarded as a plate electrode as a whole. For example, referring to FIG. 4, one electrode plate of a liquid crystal capacitor Clc is a pixel electrode 20, and the other electrode plate is the common electrode, such as the metal grid polarizing layer 13 used as the common electrode. An electric field is formed between the pixel electrode 20 and the common electrode to control a deflection state of liquid crystal molecules in the liquid crystal layer 21 (referring to FIG. 3), thereby controlling the transmittance of the polarized light, which is transmitted through the metal grid polarizing layer 13, through the liquid crystal layer 21 to realize image display.

Further, for example, in the at least one display sub-pixel having the light sensing compensation transistor part and the photoelectric conversion device, the metal grid polarizing layer 13 is electrically connected to an upper electrode 8 of the photoelectric conversion device through a third via hole 18 and a third lead line 193 filled in the third via hole 18, thereby providing a bias voltage for the photoelectric conversion device.

For example, for manufacturing convenience, the gate lines 111, the sensing control line 112, the common electrode lines 15, the gate electrode of the driving transistor part, and the gate electrode of the photosensitive compensation transistor part are arranged in the same layer and made of the same material.

For example, for manufacturing convenience, the source electrode and the drain electrode of the driving transistor part, the source electrode and the drain electrode of the light compensation transistor part, the data lines 121 and the signal reading line 122 are arranged in the same layer and made of the same material.

For example, in order to increase an aperture ratio, the light sensing compensation transistor part and the photoelectric conversion device do not have to be provided in each of the display sub-pixels 100, but are selectively provided in one or a part of the display sub-pixels 100. The setting position and the setting number of the photoelectric conversion device can be flexibly selected according to actual requirements.

Because human eyes are less sensitive to blue light, the at least one display sub-pixel provided with the light sensing compensation transistor part and the photoelectric conversion device is, for example, a blue sub-pixel, so as to reduce the effect of the light sensing compensation transistor part and the photoelectric conversion device on display brightness as much as possible.

For example, as shown in FIG. 1 and FIG. 2, the metal grid polarizing layer 13 includes an etching barrier layer 131 disposed on a side of the planarization layer 12 away from the base substrate 1, a metal grid layer 132 disposed on a side of the etching barrier layer 131 away from the base substrate 1, and a protection layer 133 disposed on a side of the metal grid layer 132 away from the base substrate 1. For example, the formation process of the metal grid layer 132 is as follows: forming a metal film on the etching barrier layer 131; forming a photoresist layer on the metal film; imprinting the photoresist layer by a nanoimprint template to form a photoresist pattern; and etching the metal film with the photoresist pattern as a mask pattern to form the metal grid layer 132. The arrangement of the etching barrier layer 131 can prevent over-etching during the above etching process and protect the underlying planarization layer 12.

For example, the protection layer 133 is provided on the metal grid layer 132 to protect the metal grid layer 132 and prevent the metal grid layer 132 from being damaged during subsequent manufacturing processes. Referring to FIG. 1 and FIG. 2, the protection layer 133 is located between the metal grid layer 132 and the pixel electrode 20, so that the protection layer 133 also has the function of realizing electrical insulation between the metal grid layer 132 and the pixel electrode 20.

For example, as shown in FIG. 1 and FIG. 2, the metal grid layer 132 includes a plurality of metal stripes arranged in parallel with one another. Further, for example, as shown in FIG. 2, the protection layer 133 covers two adjacent metal strips of the plurality of the metal strips and covers a region between the two adjacent metal strips, but the protection layer 133 is not in contact with the exposed etching barrier layer 131 in the region between the two adjacent metal stripes. In this case, the region between two adjacent metal stripes is not filled with any medium, which improves the polarization characteristics of the metal grid layer 132, so that more light can pass through the metal grid layer 132 to become polarized light. For example, the material of the protection layer 133 is oxide, nitride, or oxynitride, such as silicon oxide. For example, a suitable forming process, such as a chemical vapor deposition method, is selected so that the protection layer 133 has the structure shown in FIG. 2.

For example, as shown in FIG. 1 and FIG. 2, the orthographic projection of the color filter layer 11 on the base substrate 1 covers the orthographic projection of a channel portion in the thin film transistor layer on the base substrate 1. Specifically, for example, the orthographic projection of the color filter layer 11 on the base substrate 1 covers the orthographic projection of the active layer (for example, the channel region in the active layer) of the driving transistor portion on the base substrate 1 and covers the orthographic projection of the active layer (for example, the channel region in the active layer) of the light sensing compensation transistor on the base substrate 1 to avoid strong light in the subsequent process, such as the strong light in the process of forming the planarization layer 12, from affecting the characteristics of the driving transistor part and the light sensing compensation transistor part, and prevent the driving transistor part and the light sensing compensation transistor part from generating undesired leakage current.

For example, as shown in FIG. 2, the array substrate further includes a black matrix layer 14 disposed between the color filter layer 11 and the thin film transistor layer. For example, an orthographic projection of the black matrix layer 14 on the base substrate 1 covers the orthographic projection of the active layer (for example, the channel region in the active layer) of the driving transistor part on the base substrate 1 and the orthographic projection of the active layer (for example, the channel region in the active layer) of the light sensing compensation transistor part on the base substrate 1, so as to avoid strong light in the subsequent process, such as the strong light in the process of forming the planarization layer 12, from affecting the characteristics of the driving transistor part and the light sensing compensation transistor part, and prevent the driving transistor part and the light sensing compensation transistor part from generating undesired leakage current.

It should be noted that, according to actual requirements, both the color filter layer 11 and the black matrix layer 14 or any one of the color filter layer 11 and the black matrix layer 14 can be selected to cover the active layer of the driving transistor part (for example, the channel region in the active layer) and the active layer of the light sensing compensation transistor part (for example, the channel region in the active layer).

It should be noted that, because wiring lines are provided between adjacent display sub-pixels 100, such as the gate lines 111, the data lines 121, the sensing control line 11, the signal reading line 122, and the common electrode lines 15 as described above, the black matrix layer 14 also covers these wiring lines; the region where the driving transistor part is located, the region where the photosensitive compensation transistor part is located, and other regions covered by the black matrix are the non-display regions of the display sub-pixels, and the regions except for the non-display regions of the display sub-pixels are display regions, and quantum dot patterns included in the quantum dot layer 10 as described above are located in the display regions of the display sub-pixels.

By adopting the structure provided by the embodiments of the present disclosure, the quantum dot layer 10, the light sensing compensation transistor part and the photoelectric conversion device are disposed on the array substrate, the quantum dot layer 10 emits light stably and is not affected by the gray scale, which facilitates the collection of stable signals by the photoelectric conversion device, thereby realizing accurate real-time monitoring and compensation for regions with uneven display brightness.

For example, the black matrix layer 14 also covers a side surface of the photoelectric conversion layer 7, and an extension line of the side surface intersects the base substrate 1. As mentioned above, through the light sensing compensation transistor part and the photoelectric conversion device, the region where the amount of polarized light is not uniform can be found in real time and the gray scale compensation can be performed according to the feedback signal. By shielding the side surface of the photoelectric conversion layer 7 by the black matrix layer 14, light from other regions can be shielded from incident to the photoelectric conversion layer 7, ensuring that the photoelectric conversion layer 7 only receives the reflected light in the region where the photoelectric conversion layer 7 is located and in its adjacent regions, thereby realizing uniformity compensation for the metal grid polarizing layer 13 and the compensation of the efficiency attenuation of the quantum dot layer 10, and avoiding the problem of screen burning.

For example, as shown in FIG. 1 and FIG. 2, the metal grid polarizing layer 13 is electrically connected to a common electrode line 15 by the first via hole 16 passing through all of the metal grid polarizing layer 13, the planarization layer 12, the first passivation layer 9 and the gate insulating layer 3, and the first lead line 191 filled in the first via hole 16.

The metal grid polarizing layer 13 is electrically connected to the common electrode line 15 through the first via hole 16 and the first lead line 191 in the first via hole 16 provided in the non-display region, this electrical connection method hardly affects the pixel aperture ratio. The metal grid layer 132 is exposed at the opening of the first via hole 16 to ensure that the first lead line 191 is electrically connected with the metal grid layer 132.

For example, as shown in FIG. 1 and FIG. 2, the pixel electrode 20 is electrically connected to the drain electrode or the source electrode of the driving transistor part by the second via hole 17 passing through all of the metal grid polarizing layer 13, the planarization layer 12, and the first passivation layer 9, and the second lead line 192 filled in the second via hole 17. The metal grid layer 132 is not exposed at the opening of the second via hole 17 to prevent the metal grid layer 132 from being short-circuited with the pixel electrode 20 when the metal grid layer 132 is used as a common electrode.

For example, the first lead line 191 and the second lead line 192 are provided in the same layer and made of the same material to simplify the manufacturing process.

For example, the material of the pixel electrode 20 is a transparent conductive metal oxide, such as ITO, IGZO, and so on. In the case where a transparent conductive metal oxide is used to make the pixel electrode 20, high temperature annealing above 200° C. is not performed, and only annealing at 100 to 200° C. is performed, which can prevent the quantum dot layer 10 from being affected by the high temperature processes. The pixel electrode 20 is electrically connected to the source electrode or drain electrode 5 through a via hole and a lead line, and the connection method is simple.

For example, as shown in FIG. 1 and FIG. 2, the metal grid polarizing layer 13 is electrically connected to the upper electrode 8 by a third via hole 18 passing through both the metal grid polarizing layer 13 and the planarization layer 12, and the third lead line 193 filled in the third via hole 18. The metal grid polarizing layer 13 is connected to the upper electrode 8 through the via hole to reduce the effect on the aperture ratio as much as possible. For example, as shown in FIG. 1 and FIG. 2, the metal grid layer 132 is exposed at the opening of the third via hole 18 to ensure that the third lead line 193 is electrically connected with the upper electrode 8. For example, the protection layer 133 also covers the third lead line 193, but the protection layer 133 covers neither the first lead line 191 nor the second lead line 192.

For example, the material of the first lead line 191, the second lead line 192, and the third lead line 193 is metal or transparent conductive metal oxide.

For example, as shown in FIG. 1 and FIG. 2, the array substrate further includes a second passivation layer 6 between the first passivation layer 9 and the thin film transistor layer; the second passivation layer 6 covers the driving transistor part and the light sensing compensation transistor part; the photoelectric conversion device is located between the first passivation layer 9 and the second passivation layer 6, and the lower electrode 8' of the photoelectric conversion device is electrically connected to the source electrode or the drain electrode of the light sensing compensation transistor part by a fourth via hole 60 penetrating the second passivation layer 6.

Continuing to refer to FIG. 4, the array substrate provided by at least one embodiment of the present disclosure includes a plurality of gate lines 111 and a plurality of data lines 121, and the plurality of the gate lines 111 and the plurality of the data lines 121 intersect each other to define a plurality of display sub-pixels 100. For example, the plurality of the display sub-pixels 100 include a first display sub-pixel 101, a second display sub-pixel 102, and a third display sub-pixel 103; the quantum dot layer 10 includes a first quantum dot pattern 10a located in the first display sub-pixel 101, a second quantum dot pattern 10b located in the second display sub-pixel 102 and a third quantum dot pattern 10c located in the third display sub-pixel 103. The first quantum dot pattern 10a, the second quantum dot pattern 10b, and the third quantum dot pattern 10c emit light under excitation of light from a backlight, so that the first display sub-pixel, the second display sub-pixel, and the third display sub-pixel respectively emit light of three different colors. For example, the light of the three different colors can be mixed into white light. For example, the first quantum dot pattern 10a, the second quantum dot pattern 10b, and the third quantum dot pattern 10c are respectively formed of different materials.

For example, the light from the backlight is ultraviolet light; the first display sub-pixel 101 is a red sub-pixel, and the first quantum dot pattern 10a generates red light under the excitation of ultraviolet light; the second display sub-pixel 102 is a green sub-pixel, the second quantum dot pattern 10b generates green light under the excitation of ultraviolet light; and the third display sub-pixel 103 is a blue sub-pixel, and the third quantum dot pattern 10c generates blue light under the excitation of the ultraviolet light. For example, in a direction perpendicular to the base substrate, a height of the first quantum dot pattern 10a, a height of the second quantum dot pattern 10b, and a height of the third quantum dot pattern 10c are equal to each other, so as to reduce the difficulty of manufacturing the planarization layer 12.

For example, the quantum dot layer 10 includes a first quantum dot pattern 10a located in the first display sub-pixel 101 and a second quantum dot pattern 10b located in the second display sub-pixel 102; the array substrate further includes a light diffusion pattern 10d located in a third display sub-pixel 103, the light diffusion pattern 10d is arranged in the same layer as both the first quantum dot pattern 10a and the second quantum dot pattern 10b; both the first quantum dot pattern 10a and the second quantum dot pattern 10b emit light under the excitation of light from the backlight, and light from the backlight passes through the light diffusion pattern 10d and is uniformized by the light diffusion pattern 10d, so that the first display sub-pixel 101, the second display sub-pixel 102 and the third display sub-pixel 103 respectively emit light of three different colors. For example, the light of the three different colors can be mixed into white light. For example, the first quantum dot pattern 10a and the second quantum dot pattern 10b are respectively formed of different materials. For example, the light diffusion pattern 10d includes an organic matrix and inorganic particles dispersed in the organic matrix; the material of the organic matrix is, for example, a chemically stable resin material, and the material of the inorganic particles is, for example, titanium dioxide, silicon dioxide, zirconium dioxide, and aluminum oxide, and so on.

For example, the third display sub-pixel 103 is a blue sub-pixel, and the light from the backlight is blue light; the first display sub-pixel 101 is a red sub-pixel, and the first quantum dot pattern 10a generates red light under the excitation of blue light; and the second display sub-pixel 102 is a green sub-pixel, and the second quantum dot pattern 10b generates green light under the excitation of blue light. For example, in a direction perpendicular to the base substrate, a height of the light diffusion pattern 10d, the height of the first quantum dot pattern 10a, and the height of the second quantum dot pattern 10b are equal to each other, so as to reduce the manufacturing difficulty of the planarization layer 12.

Figure 3:
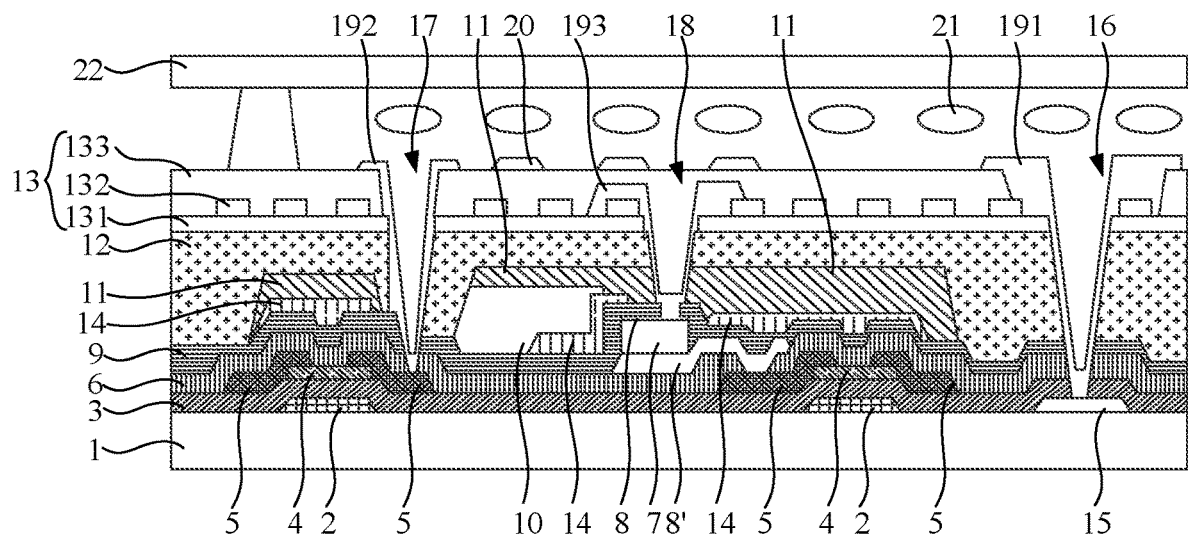
FIG. 3 is a schematic diagram of a structure of a display panel provided by an embodiment of the present disclosure.

At least one embodiment of the present disclosure further provides a display panel, as shown in FIG. 3, the display panel includes any one of the array substrates provided in the above technical solutions, a counter substrate 22 disposed opposite to the array substrate, and a liquid crystal layer 21a disposed between the array substrate and the counter substrate 22. For example, the backlight is located on the side of the array substrate 1 away from the counter substrate 22. For example, the backlight is a direct type backlight or an edge type backlight. For example, the backlight uses a light source emitting blue light or ultraviolet light, such as OLED lamp beads or OLED lamp strips.

At least one embodiment of the present disclosure further provides a display device, which includes any one of the display panels provided in the above technical solutions. For example, the display device is any product or component with a display function, such as a mobile phone, a tablet computer, a television, a monitor, a notebook computer, a digital photo frame, a navigator and so on, which are not limited in the embodiments of the present disclosure.

What are described above is related to only the illustrative embodiments of the present disclosure and not limitative to the protection scope of the present application. Therefore, the protection scope of the present application shall be defined by the accompanying claims.

What is claimed is:

1. An array substrate, comprising:
a base substrate;
a thin film transistor layer on the base substrate;
a first passivation layer on a side of the thin film transistor layer away from the base substrate;
a quantum dot layer on a side of the first passivation layer away from the base substrate and in a display region of the array substrate;
a color filter layer on a side of the quantum dot layer away from the base substrate, wherein an orthographic projection of the quantum dot layer on the base substrate is within an orthographic projection of the color filter layer on the base substrate;
a planarization layer on a side of the first passivation layer away from the base substrate and on a side of the color filter layer away from the base substrate;
a metal grid polarizing layer on a side of the planarization layer away from the base substrate; and
a photoelectric conversion device configured to receive a part of excitation light generated by the quantum dot layer and reflected by the metal grid polarizing layer and convert the part of the excitation light into an electrical signal.

2. The array substrate according to claim 1, wherein the thin film transistor layer comprises a driving transistor part and a light sensing compensation transistor part, each of the driving transistor part and the light sensing compensation transistor part comprises a gate electrode, a gate insulating layer, an active layer, a source electrode and a drain electrode;
the photoelectric conversion device comprises an upper electrode, a lower electrode, and a photoelectric conversion layer between the upper electrode and the lower electrode, and the lower electrode is electrically connected to the source electrode or the drain electrode of the light sensing compensation transistor part.

3. The array substrate according to claim 2, further comprising a plurality of gate lines and a plurality of data lines, wherein the plurality of the gate lines and the plurality of the data lines intersect each other to define a plurality of display sub-pixels,
each of the display sub-pixels comprises the driving transistor part, the gate electrode of the driving transistor part is electrically connected to a corresponding gate line, and the source electrode or the drain electrode of the driving transistor is electrically connected to a corresponding data line; and
in each of the display sub-pixels, a pixel electrode is provided on a side of the metal grid polarizing layer away from the base substrate, and the pixel electrode is electrically connected to the drain electrode or the source electrode of the driving transistor part through a second via hole and a second lead line filled in the second via hole.

4. The array substrate according to claim 3, wherein the light sensing compensation transistor part and the photoelectric conversion device are in at least one display sub-pixel of the plurality of the display sub-pixels;

the array substrate further comprises a sensing control line provided in parallel with the plurality of the gate lines and a signal reading line provided in parallel with the plurality of the data lines; and the gate electrode of the light sensing compensation transistor part is electrically connected to the sensing control line, and the drain electrode or the source electrode of the light sensing compensation transistor part is electrically connected to the signal reading line.

5. The array substrate according to claim 4, further comprising a common electrode line provided in parallel with the plurality of the gate lines, wherein:

in each of the display sub-pixels, the metal grid polarizing layer is electrically connected to the common electrode line through a first via hole and a first lead line filled in the first via hole, so that the metal grid polarizing layer is further used as a common electrode; and in the at least one display sub-pixel, the metal grid polarizing layer is electrically connected to the upper electrode of the photoelectric conversion device through a third via hole and a third lead line filled in the third via hole.

6. The array substrate according to claim 5, wherein the at least one display sub-pixel is a blue sub-pixel.

7. The array substrate according to claim 2, wherein the orthographic projection of the color filter layer on the base substrate covers an orthographic projection of the active layer of the driving transistor part on the base substrate and an orthographic projection of the active layer of the light sensing compensation transistor part on the base substrate.

8. The array substrate according to claim 2, further comprising a black matrix layer between the color filter layer and the thin film transistor layer, wherein:

an orthographic projection of the black matrix layer on the base substrate covers an orthographic projection of the active layer of the driving transistor part on the base substrate and an orthographic projection of the active layer of the light sensing compensation transistor part on the base substrate.

9. The array substrate according to claim 8, wherein the black matrix layer further covers a side surface of the photoelectric conversion layer, and an extension line of the side surface intersects with the base substrate.

10. The array substrate according to claim 2, further comprising a second passivation layer between the first passivation layer and the thin film transistor layer, wherein:

the second passivation layer covers the driving transistor part and the light sensing compensation transistor part; and the photoelectric conversion device is between the first passivation layer and the second passivation layer, and the lower electrode of the photoelectric conversion device is electrically connected to the source electrode or the drain electrode of the light sensing compensation transistor through a fourth via hole penetrating the second passivation layer.

11. The array substrate according to claim 1, further comprising a plurality of gate lines and a plurality of data lines, wherein the plurality of the gate lines and the plurality of the data lines intersect each other to define a plurality of display sub-pixels, the plurality of the display sub-pixels comprise a first display sub-pixel, a second display sub-pixel, and a third display sub-pixel; and the quantum dot layer comprises a first quantum dot pattern in the first display sub-pixel, a second quantum dot pattern in the second display sub-pixel, and a third quantum dot pattern in the third display sub-pixel, the first quantum dot pattern, the second quantum dot pattern, and the third quantum dot pattern emit light under excitation of light from a backlight, so that the first display sub-pixel, the second display sub-pixel, and the third display sub-pixel respectively emit light of three different colors.

12. The array substrate according to claim 11, wherein the light from the backlight is ultraviolet light;

the first display sub-pixel is a red sub-pixel, and the first quantum dot pattern generates red light under excitation of the ultraviolet light;

the second display sub-pixel is a green sub-pixel, and the second quantum dot pattern generates green light under excitation of the ultraviolet light; and the third display sub-pixel is a blue sub-pixel, and the third quantum dot pattern generates blue light under excitation of the ultraviolet light.

13. The array substrate according to claim 1, further comprising a plurality of gate lines and a plurality of data lines, wherein the plurality of the gate lines and the plurality of the data lines intersect each other to define a plurality of display sub-pixels, the plurality of the display sub-pixels comprise a first display sub-pixel, a second display sub-pixel, and a third display sub-pixel;

the quantum dot layer comprises a first quantum dot pattern in the first display sub-pixel and a second quantum dot pattern in the second display sub-pixel;

the array substrate further comprises a light diffusion pattern in the third display sub-pixel, and the light diffusion pattern is in a same layer as both the first quantum dot pattern and the second quantum dot pattern; and the first quantum dot pattern and the second quantum dot pattern emit light under excitation of light from a backlight, and light from the backlight passes through the light diffusion pattern and is uniformized by the light diffusion pattern, so that the first display sub-pixel, the second display sub-pixel, and the third display sub-pixel respectively emit light of three different colors.

14. The array substrate according to claim 13, wherein the third display sub-pixel is a blue sub-pixel, and the light from the backlight is blue light;

the first display sub-pixel is a red sub-pixel, and the first quantum dot pattern generates red light under excitation of the blue light; and the second display sub-pixel is a green sub-pixel, and the second quantum dot pattern generates green light under excitation of the blue light.

15. The array substrate according to claim 13, wherein the light diffusion pattern comprises an organic matrix and inorganic particles dispersed in the organic matrix.

16. The array substrate according to claim 1, wherein the metal grid polarizing layer comprises an etching barrier layer on a side of the planarization layer away from the base substrate, a metal grid layer on a side of the etching barrier layer away from the base substrate, and a protection layer on a side of the metal grid layer away from the base substrate.

17. The array substrate according to claim 16, wherein the metal grid layer comprises a plurality of metal strips provided in parallel with one another, and the protection layer covers two adjacent metal strips of the plurality of the metal strips and covers a region between the two adjacent metal strips, but the protection layer is not in contact with the etching barrier layer exposed in the region between the two adjacent metal strips.

18. The array substrate according to claim 1, wherein the planarization layer comprises a thermal curable layer and a photo curable layer, the thermal curable layer is closer to the base substrate than the photo curable layer, and a surface of the photo curable layer away from the base substrate is flat.

19. A display panel, comprising the array substrate according to claim 1, a counter substrate provided opposite to the array substrate, and a liquid crystal layer between the array substrate and the counter substrate.

20. A display device, comprising the display panel according to claim 19.

* * * * *